US011768502B2

(12) United States Patent
Wu et al.

(10) Patent No.: US 11,768,502 B2
(45) Date of Patent: *Sep. 26, 2023

(54) METHOD, SYSTEM AND RELATED DEVICE OF IMPLEMENTING VEHICLE AUTOMATIC PAYMENT

(71) Applicant: Beijing Tusen Zhitu Technology Co., Ltd., Beijing (CN)

(72) Inventors: Nan Wu, Beijing (CN); He Zheng, Beijing (CN)

(73) Assignee: BEIJING TUSEN ZHITU TECHNOLOGY CO., LTD., Beijing (CN)

(*) Notice: Subject to any disclaimer, the term of this patent is extended or adjusted under 35 U.S.C. 154(b) by 0 days.

This patent is subject to a terminal disclaimer.

(21) Appl. No.: 17/548,465

(22) Filed: Dec. 10, 2021

(65) Prior Publication Data
US 2022/0100199 A1 Mar. 31, 2022

Related U.S. Application Data

(63) Continuation of application No. 16/035,664, filed on Jul. 15, 2018, now Pat. No. 11,199,848.

(30) Foreign Application Priority Data

Jul. 21, 2017 (CN) .................. 201710601976.8

(51) Int. Cl.
G05D 1/02 (2020.01)
G05D 1/00 (2006.01)
(Continued)

(52) U.S. Cl.
CPC ......... *G05D 1/0225* (2013.01); *G05D 1/0088* (2013.01); *G06Q 20/085* (2013.01);
(Continued)

(58) Field of Classification Search
CPC .............. G05D 1/0088; G05D 1/0225; G05D 2201/0213; G06Q 20/085; G06Q 20/3223;
(Continued)

(56) References Cited

U.S. PATENT DOCUMENTS 5,101,200 A * 3/1992 Swett ................... G07B 15/063
340/928
5,485,520 A * 1/1996 Chaum ................ G06Q 20/367
342/51

(Continued)

FOREIGN PATENT DOCUMENTS

CN 103903308 A 7/2014
CN 105448087 A 3/2016
(Continued)

OTHER PUBLICATIONS

No Author. Chinese Application No. 201710601976.8 First Search Report dated Jun. 28, 2018, pp. 1.
(Continued)

Primary Examiner — Babar Sarwar
(74) Attorney, Agent, or Firm — Perkins Coie LLP

(57) ABSTRACT

The present application discloses a method, system and related device of implementing vehicle automatic payment. The method includes: controlling, by a vehicle controller, a vehicle to drive automatically and stop at a payment position; obtaining, by a payment terminal, vehicle identification information of the vehicle, and determining payment amount corresponding to the vehicle identification information; sending, by the payment terminal, leaving indication information to the vehicle controller after determining that the vehicle controller pays the payment amount; and con-
(Continued)

trolling, by the vehicle controller, the vehicle to start and leave the payment position when receiving the leaving indication information.

20 Claims, 4 Drawing Sheets

(51) Int. Cl.
| | |
|---|---|
| *H04W 4/40* | (2018.01) |
| *G06Q 20/08* | (2012.01) |
| *G06Q 20/40* | (2012.01) |
| *H04W 4/44* | (2018.01) |
| *G06Q 20/32* | (2012.01) |
| *G06Q 50/30* | (2012.01) |
| *H04W 4/80* | (2018.01) |

(52) U.S. Cl.
CPC ..... *G06Q 20/3223* (2013.01); *G06Q 20/3274* (2013.01); *G06Q 20/3276* (2013.01); *G06Q 20/40* (2013.01); *H04W 4/40* (2018.02); *H04W 4/44* (2018.02); *G05D 2201/0213* (2013.01); *G06Q 50/30* (2013.01); *H04W 4/80* (2018.02)

(58) Field of Classification Search
CPC ........... G06Q 20/3274; G06Q 20/3276; G06Q 20/40; G06Q 50/30; G06Q 40/12; H04W 4/40; H04W 4/44; H04W 4/80; G08G 1/065
See application file for complete search history.

(56) References Cited

U.S. PATENT DOCUMENTS

| | | | | |
|---|---|---|---|---|
| 5,602,919 | A * | 2/1997 | Hurta | G06Q 20/085 |
| | | | | 705/13 |
| 6,529,880 | B1 * | 3/2003 | McKeen | G06Q 20/04 |
| | | | | 705/17 |
| 6,705,521 | B1 * | 3/2004 | Wu | G07B 15/063 |
| | | | | 379/355.06 |
| 6,777,904 | B1 | 8/2004 | Degner | |
| 7,103,460 | B1 | 9/2006 | Breed | |
| 7,783,403 | B2 | 8/2010 | Breed | |
| 8,412,449 | B2 | 4/2013 | Trepagnier | |
| 8,788,134 | B1 | 7/2014 | Litkouhi | |
| 8,965,621 | B1 | 2/2015 | Urmson | |
| 9,002,632 | B1 | 4/2015 | Emigh | |
| 9,111,444 | B2 | 8/2015 | Kaganovich | |
| 9,134,402 | B2 | 9/2015 | Sebastian | |
| 9,248,835 | B2 | 2/2016 | Tanzmeister | |
| 9,315,192 | B1 | 4/2016 | Zhu | |
| 9,317,033 | B2 | 4/2016 | Ibanez-guzman | |
| 9,342,074 | B2 | 5/2016 | Dolgov | |
| 9,399,397 | B2 | 7/2016 | Mizutani | |
| 9,438,878 | B2 | 9/2016 | Niebla | |
| 9,476,970 | B1 | 10/2016 | Fairfield | |
| 9,535,423 | B1 | 1/2017 | Debreczeni | |
| 9,568,915 | B1 | 2/2017 | Berntorp | |
| 9,587,952 | B1 | 3/2017 | Slusar | |
| 9,720,418 | B2 | 8/2017 | Stenneth | |
| 9,723,097 | B2 | 8/2017 | Harris | |
| 9,723,099 | B2 | 8/2017 | Chen | |
| 9,738,280 | B2 | 8/2017 | Rayes | |
| 9,746,550 | B2 | 8/2017 | Nath | |
| 9,911,169 | B1 * | 3/2018 | Geist | G06Q 50/30 |
| 10,121,289 | B1 * | 11/2018 | Gravelle | G07B 15/02 |
| 10,158,480 | B1 * | 12/2018 | Winklevoss | H04L 9/3247 |
| 10,417,541 | B1 * | 9/2019 | Mishra | G06K 19/06046 |
| 10,845,822 | B2 * | 11/2020 | Gariepy | G05D 1/0297 |
| 2002/0109611 | A1 * | 8/2002 | Howard | G07B 15/02 |
| | | | | 340/932.2 |
| 2004/0167861 | A1 * | 8/2004 | Hedley | G06Q 50/30 |
| | | | | 705/400 |
| 2004/0263356 | A1 * | 12/2004 | Wu | G06Q 40/12 |
| | | | | 705/13 |
| 2008/0040210 | A1 * | 2/2008 | Hedley | G06Q 50/30 |
| | | | | 382/104 |
| 2008/0249667 | A1 | 10/2008 | Horvitz | |
| 2008/0270226 | A1 * | 10/2008 | Archibald | G06Q 30/02 |
| | | | | 705/13 |
| 2009/0040054 | A1 | 2/2009 | Nang | |
| 2009/0060395 | A1 * | 3/2009 | Weiss | G06Q 20/40 |
| | | | | 705/13 |
| 2010/0036716 | A1 * | 2/2010 | Kim | G06Q 50/30 |
| | | | | 705/13 |
| 2010/0049397 | A1 | 2/2010 | Lin | |
| 2010/0104392 | A1 * | 4/2010 | Bowen | B60P 3/08 |
| | | | | 410/26 |
| 2010/0106567 | A1 * | 4/2010 | McNew | G06Q 30/04 |
| | | | | 705/13 |
| 2010/0113013 | A1 * | 5/2010 | Karabinis | H04W 4/80 |
| | | | | 705/26.1 |
| 2010/0161391 | A1 * | 6/2010 | Ashby | G06Q 50/30 |
| | | | | 73/23.31 |
| 2010/0161392 | A1 * | 6/2010 | Ashby | G06Q 50/30 |
| | | | | 705/13 |
| 2010/0253482 | A1 * | 10/2010 | Catala Mora | G06Q 20/127 |
| | | | | 340/10.51 |
| 2010/0325049 | A1 * | 12/2010 | Tanaka | G06Q 20/10 |
| | | | | 235/487 |
| 2010/0332363 | A1 * | 12/2010 | Duddle | G06Q 40/12 |
| | | | | 705/41 |
| 2011/0288909 | A1 * | 11/2011 | Hedley | G06Q 50/30 |
| | | | | 705/13 |
| 2013/0013413 | A1 * | 1/2013 | McDaniel | G06Q 30/0266 |
| | | | | 705/500 |
| 2013/0110685 | A1 * | 5/2013 | Dempski | G06Q 10/047 |
| | | | | 705/30 |
| 2013/0282283 | A1 * | 10/2013 | Bondesen | H04L 63/0884 |
| | | | | 701/538 |
| 2013/0297387 | A1 * | 11/2013 | Michael | G06Q 30/02 |
| | | | | 705/13 |
| 2014/0249896 | A1 * | 9/2014 | Nerayoff | G06T 7/90 |
| | | | | 705/13 |
| 2014/0324482 | A1 * | 10/2014 | Wallach | G06Q 40/08 |
| | | | | 705/4 |
| 2015/0088738 | A1 * | 3/2015 | Cateland | G06Q 20/227 |
| | | | | 705/41 |
| 2015/0100394 | A1 * | 4/2015 | Povolny | G07B 15/063 |
| | | | | 705/13 |
| 2015/0346727 | A1 * | 12/2015 | Ramanujam | G05D 1/0088 |
| | | | | 701/23 |
| 2016/0097648 | A1 * | 4/2016 | Hannah | G08G 1/0116 |
| | | | | 701/118 |
| 2016/0203651 | A1 | 7/2016 | Heath | |
| 2016/0232565 | A1 * | 8/2016 | Goergen | G06Q 10/20 |
| 2016/0321381 | A1 | 11/2016 | English | |
| 2016/0375907 | A1 | 12/2016 | Erban | |
| 2017/0046883 | A1 * | 2/2017 | Gordon | G06Q 50/30 |
| 2017/0123421 | A1 * | 5/2017 | Kentley | G06Q 10/00 |
| 2017/0127230 | A1 * | 5/2017 | Enriquez | H04W 4/44 |
| 2017/0213262 | A1 * | 7/2017 | Kelley, II | G06Q 20/3224 |
| 2017/0228717 | A1 * | 8/2017 | Rovik | G06Q 20/085 |
| 2017/0245107 | A1 * | 8/2017 | Lei | H04W 4/40 |
| 2017/0327084 | A1 * | 11/2017 | Park | B60R 16/037 |
| 2018/0033244 | A1 * | 2/2018 | Northrup | G08G 1/0175 |
| 2018/0089631 | A1 * | 3/2018 | Baker, Sr. | G06Q 10/087 |
| 2018/0101877 | A1 * | 4/2018 | Song | G06Q 30/0284 |
| 2018/0190040 | A1 * | 7/2018 | Batten | G06Q 20/405 |
| 2018/0268238 | A1 * | 9/2018 | Khan | G06V 10/751 |
| 2018/0335781 | A1 * | 11/2018 | Chase | G08G 1/0112 |
| 2018/0336427 | A1 * | 11/2018 | Gibbs | G08G 1/146 |
| 2019/0025845 | A1 * | 1/2019 | Wu | H04W 4/40 |
| 2019/0031039 | A1 * | 1/2019 | Wunderlich | B60L 53/665 |
| 2019/0043001 | A1 * | 2/2019 | Woulfe | G01C 21/3438 |
| 2019/0137290 | A1 * | 5/2019 | Levy | G01C 21/3461 |
| 2020/0234582 | A1 * | 7/2020 | Mintz | G08G 1/096811 |
| 2021/0114616 | A1 * | 4/2021 | Altman | H04W 8/205 |

(56) References Cited

U.S. PATENT DOCUMENTS

FOREIGN PATENT DOCUMENTS

| CN | 105701865 A | 6/2016 |
|---|---|---|
| JP | 2005322072 A | 11/2005 |

OTHER PUBLICATIONS

No Author. Chinese Application No. 201710601976.8 First Office Action dated Jul. 6, 2018, pp. 1-11.
Spinello, Luciano, Triebel, Rudolph, Siegwart, Roland, "Multiclass Multimodal Detection and Tracking in Urban Environments", Sage Journals, vol. 29 issue: 12, pp. 1498-1515 Article first published online: Oct. 7, 2010; Issue published: Oct. 1, 2010.
Matthew Barth, Carrie Malcolm, Theodore Younglove, and Nicole Hill, "Recent Validation Efforts for a Comprehensive Modal Emissions Model", Transportation Research Record 1750, Paper No. 01-0326, College of Engineering, Center for Environmental Research and Technology, University of California, Riverside, CA 92521, dale unknown.
Kyoungho Ahn, Hesham Rakha, "The Effects of Route Choice Decisions on Vehicle Energy Consumption and Emissions", Virginia Tech Transportation Institute, Blacksburg, VA 24061, dale unknown.
Ramos, Sebastian, Gehrig, Stefan, Pinggera, Peter, Franke, Uwe, Rother, Carsten, "Detecting Unexpected Obstacles or Self-Driving Cars: Fusing Deep Learning and Geometric Modeling", arXiv:1612.06573v1 [cs.CV] Dec. 20, 2016.
Schroff, Florian, Dmitry Kalenichenko, James Philbin, (Google), "FaceNet: A Unified Embedding for Face Recognition and Clustering", CVPR 2015.
Dai, Jifeng, Kaiming He, Jian Sun, (Microsoft Research), "Instance-aware Semantic Segmentation via Multi-task Network Cascades", CVPR 2016.
Huval, Brody, Tao Wang, Sameep Tandon, Jeff Kiske, Will Song, Joel Pazhayampallil, Mykhaylo Andriluka, Pranav Rajpurkar, Toki Migimatsu, Royce Cheng-Yue, Fernando Mujica, Adam Coates, Andrew-Ng, "An Empirical Evaluation of Deep Learning on Highway Driving", arXiv:1504.01716v3 [cs.RO] Apr. 17, 2015.
Tian Li, "Proposal Free Instance Segmentation Based on Instance-aware Metric", Department of Computer Science, Cranberry-Lemon University, Pittsburgh, PA., date unknown.
Mohammad Norouzi, David J. Fleet, Ruslan Salakhutdinov, "Hamming Distance Metric Learning", Departments of Computer Science and Statistics, University of Toronto, date unknown.
Jain, Suyong Dutt, Grauman, Kristen, "Active Image Segmentation Propagation", In Proceedings of the IEEE Conference on Computer Vision and Pattern Recognition (CVPR), Las Vegas, Jun. 2016.

MacAodha, Oisin, Campbell, Neill D.F., Kautz, Jan, Breslow, Gabriel J., "Hierarchical Subquery Evaluation for Active earning on a Graph", In Proceedings of the IEEE Conference on Computer Vision and Pattern Recognition (CVPR), 2014.
Kendall, Alex, Gal, Yarin, "What Uncertainties Do We Need in Bayesian Deep Learning for Computer Vision", rXiv:1703.04977v1 [cs.CV] Mar. 15, 2017.
Wei, Junqing, John M. Dolan, Bakhtiar Litkhouhi, "A Prediction- and Cost Function-Based Algorithm for Robust Autonomous Freeway Driving", 2010 IEEE Intelligent Vehicles Symposium, University of California, San Diego, CA, USA, Jun. 21-24, 2010.
Deter Welinder, Steve Branson, Serge Belongie, Pietro Perona, "The Multidimensional Wisdom of Crowds"; http://www.vision.caltech.edu/visipedia/papers/WelinderEtalNIPS10.pdf, 2010.
Kai Yu, Yang Zhou, Da Li, Zhang Zhang, Kaiqi Huang, "Large-scale Distributed Video Parsing and Evaluation Platform", Center for Research on Intelligent Perception and Computing, Institute of Automation, Chinese Academy of Sciences, China, arXiv:1611.09580v1 [cs.CV] Nov. 29, 2016.
P. Guarneri, G. Rocca and M. Gobbi, "A Neural-Network-Based Model for the Dynamic Simulation of the Tire/ Suspension System While Traversing Road Irregularities," in IEEE Transactions on Neural Networks, vol. 19, No. 9, pp. 1549-1563, Sep. 2008.
C. Yang, Z. Li, R. Cui and B. Xu, "Neural Network-Based Motion Control of an Underactuated Wheeled Inverted Pendulum Model," in IEEE Transactions on Neural Networks and Learning Systems, vol. 25, No. 11, pp. 2004-2016, Nov. 2014.
Stephan R. Richter, Vibhav Vineet, Stefan Roth, Vladlen Koltun, "Playing for Data: Ground Truth from Computer Sames", Intel Labs, European Conference on Computer Vision {ECCV), Amsterdam, the Netherlands, 2016.
Thanos Athanasiadis, Phivos Mylonas, Yannis Avrithis, and Stefanos Kollias, "Semantic Image Segmentation and Object Labeling", IEEE Transactions on Circuits and Systems for Video Technology, vol. 17, No. 3, Mar. 2007.
Marius Cordis, Mohamed Omran, Sebastian Ramos, Timo Rehfeld, Markus Enzweiler Rodrigo Benenson, Uwe Franke, Stefan Roth, and Bernt Schiele, "The Cityscapes Dataset for Semantic Urban Scene Understanding", Proceedings of the IEEE Computer Society Conference on Computer Vision and Pattern Recognition {CVPR), Las Vegas, Nevada, 2016.
Adhiraj Somani, Nan Ye, David Hsu, and Wee Sun Lee, "DESPOT: Online POMDP Planning with Regularization", Department of Computer Science, National University of Singapore, dale unknown.
Adam Paszke, Abhishek Chaurasia, Sangpil Kim, and Eugenio Culurciello. Enet: A deep neural network Architecture for real-lime semantic segmentation. CoRR, abs/1606.02147, 2016.

* cited by examiner

METHOD, SYSTEM AND RELATED DEVICE OF IMPLEMENTING VEHICLE AUTOMATIC PAYMENT

CROSS-REFERENCES TO RELATED APPLICATIONS

This patent document is a continuation of and claims benefit of priority to U.S. application Ser. No. 16/035,664, filed on Jul. 15, 2018, which claims the priority from Chinese Patent Application No. 201710601976.8, filed with the Chinese Patent Office on Jul. 21, 2017 and entitled "METHOD, SYSTEM AND RELATED DEVICE OF IMPLEMENTING VEHICLE AUTOMATIC PAYMENT". The entire contents of the before-mentioned patent applications are incorporated by reference as part of the disclosure of this document.

FIELD

The present application relates to the autonomous driving field, and particularly to a method of implementing vehicle automatic payment, a system of implementing vehicle automatic payment, a vehicle controller, and a payment terminal.

BACKGROUND

With the development of the autonomous driving technology, the autonomous vehicles will be more and more popular. Thus, for the unmanned vehicles, how to implement the automatic payment at the payment position becomes an urgent problem to be solved by those skilled in the art.

BRIEF SUMMARY

The present application provides a method and system of implementing vehicle automatic payment, a vehicle controller, and a payment terminal.

An embodiment of the present application provides a method of implementing vehicle automatic payment, which includes:
controlling, by a vehicle controller, a vehicle to drive automatically and stop at a payment position;
obtaining, by a payment terminal, vehicle identification information of the vehicle, and determining payment amount corresponding to the vehicle identification information;
sending, by the payment terminal, leaving indication information to the vehicle controller after determining that the vehicle controller pays the payment amount; and
controlling, by the vehicle controller, the vehicle to start and leave the payment position when receiving the leaving indication information.

An embodiment of the present application provides a system of implementing vehicle automatic payment, which includes a vehicle controller and a payment terminal, wherein:
the vehicle controller is configured to control a vehicle to drive automatically and stop at a payment position, and control the vehicle to start and leave the payment position when receiving leaving indication information sent by the payment terminal; and
the payment terminal is configured to obtain vehicle identification information of the vehicle, determine payment amount corresponding to the vehicle identification information, and send the leaving indication information to the vehicle controller after determining that the vehicle controller pays the payment amount.

An embodiment of the present application further provides a vehicle controller, which includes:
a communication unit configured to receive and send information; and
a control unit configured to control a vehicle to drive automatically and stop at a payment position, and control the vehicle to start and leave the payment position when receiving, through the communication unit, leaving indication information from a payment terminal.

An embodiment of the present application provides a payment terminal, which includes:
a communication unit configured to receive and send information; and
a charge control unit configured to obtain vehicle identification information of a vehicle stopping at a payment position, determine payment amount corresponding to the vehicle identification information, and send leaving indication information to a vehicle controller of the vehicle after determining that the vehicle controller pays the payment amount.

BRIEF DESCRIPTION OF THE DRAWINGS

The accompanying drawings are used to provide the further understanding of the invention and constitute a part of the specification, and serve to explain the present application together with the embodiments of the present application but not limit the present application.

DETAILED DESCRIPTION OF THE EMBODIMENTS

In order to make those skilled in the art better understand the technical solution in the present application, the technical solution in the embodiments of the present application will be described clearly and completely below in combination with the accompanying drawings in the embodiments of the present application. Obviously the described embodiments are just a part of the embodiments of the present application but not all the embodiments. Based upon the embodiments of the present application, all of other embodiments obtained by those ordinary skilled in the art without creative work should pertain to the protection scope of the present application.

For the problem that the automatic payment of the autonomous vehicle can not be implemented in the prior art, the embodiments of the present application provide a method and system of implementing vehicle automatic payment, in which a payment terminal is arranged at each payment position, and the vehicle controller controls the vehicle to drive automatically and stop at the payment position, and then interacts with the payment terminal at the payment position to accomplish the automatic payment without manual intervention, thereby achieving the function of the automatic payment of the autonomous vehicle.

In an embodiment of the present application, the vehicle controller of the vehicle can be a DSP (Digital Signal Processor), FPGA (Field-Programmable Gate Array) controller, industrial computer, driving computer, ECU (Electronic Control Unit), or VCU (Vehicle Control Unit) or the like, which is not limited strictly by the present application.

First Embodiment

Figure 1:
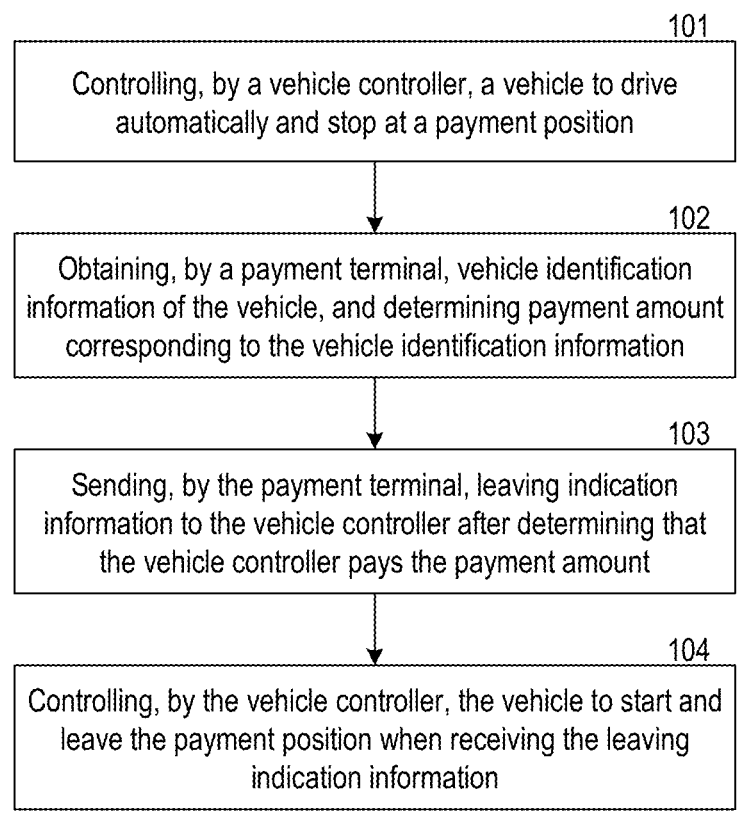
FIG. 1 is the first one of flow charts of a method of implementing vehicle automatic payment in an embodiment of the present application.

Referring to FIG. 1 which is a flow chart of a method of implementing vehicle automatic payment in an embodiment of the invention, the method includes:

Step 101: controlling, by a vehicle controller, a vehicle to drive automatically and stop at a payment position.

Step 102: obtaining, by a payment terminal, vehicle identification information of the vehicle, and determining payment amount corresponding to the vehicle identification information.

Step 103: sending, by the payment terminal, leaving indication information to the vehicle controller after determining that the vehicle controller pays the payment amount.

Step 104: controlling, by the vehicle controller, the vehicle to start and leave the payment position when receiving the leaving indication information.

In the step 102, the payment terminal obtains the vehicle identification information of the vehicle, which can be achieved by but not limited to any of the following modes (modes A1 and A2):

Mode A1: the payment terminal identifies the vehicle identification information of the vehicle.

Mode A2: the payment terminal receives the vehicle identification information of the vehicle from the vehicle controller.

The vehicle controller can communicate with the payment terminal via a base station, bluetooth, WIFI or the like, which is not limited strictly by the present application.

The mode A1 can be implemented by but not limited to the following mode A11 or A12:

Mode A11: the payment terminal controls a sensor to take an image of the vehicle, and performs image identification processing on the image to obtain the vehicle identification information of the vehicle.

The sensor can be a video camera which can be mounted nearly to the payment position, where the lens faces directly to the payment position, e.g., mounted on a fixture near the payment position. The angle of the lens of the video camera can be adjusted automatically.

According to the image posted back from the camera, the payment terminal can perform the image processing on this image. When the vehicle identification information is identified from the image, the vehicle identification information is to be verified; when the vehicle identification information is not identified from the image, the shooting angle of the camera is adjusted automatically and the above actions are repeated until the vehicle identification information is identified.

The payment terminal identifies the vehicle identification information from the image, which can be implemented by the following way: the payment terminal extracts features from the image, compares the extracted features with the features corresponding to the preset vehicle identification information, and determines the vehicle identification information according to the features compared successfully. In an embodiment of the present application, the above vehicle identification information is the information associated only with the vehicle, for example, can be the license plate number. When the vehicle identification information is the license plate number, the features corresponding to the vehicle identification information include size, shape (rectangular frame), color (blue or black), text features (length of the text string in the rectangular frame) and the like.

Mode A12: the payment terminal controls the sensor to scan a two-dimensional code or bar code on the vehicle, to obtain the vehicle identification information of the vehicle.

In an embodiment of the present application, the two-dimensional code or bar code containing the vehicle identification information can be pasted or printed in advance on a particular position of the vehicle, such as the front windshield, the left side panel of the vehicle. The payment terminal adjusts the shooting angle of the camera until the two-dimensional code or bar code is scanned successfully.

In some embodiments, in the step 102, the payment terminal determines the payment amount corresponding to the vehicle identification information, which can be implemented by but not limited to any of the following modes (modes B1 to B2):

Mode B1: the payment terminal obtains the weighing result and the driving mileage corresponding to the vehicle identification information, and calculates the payment amount according to the weighing result and the driving mileage.

In the embodiment of the present application, the payment terminal calculates the payment amount according to the weighing result and the driving mileage, which can be achieved by the following way: the payment terminal pre-stores the roadway charging standard, in which the fees to be paid by the vehicles of different types and different weights when driving 1 kilometer on various roadways are recorded; the payment terminal calculates the fee required to be paid per kilometer by the vehicle according to the obtained weighing result, the vehicle type and the driven roadway, and then calculates the product of the fee paid for per kilometre and the driving mileage (in kilometres) to obtain the payment amount required to be paid by the vehicle.

For example, the charging standards corresponding to the truck of more than 15 tones on different expressways are as follows:

1) 2 Yuan/kilometre on the G1 Beijing-Haerbin expressway, G6 Beijing-Tibet expressway, G7 Beijing-Xinjiang expressway, G45 Daqing-Guangzhou expressway, G4501 sixth ring road, G102 Tongzhou-Yanjiao expressway, G106 Beijing-Guangzhou line, S15 Beijing-Tianjin expressway, S36 airport northern line, S46 Beijing-Pinggu expressway.

2) 0.81 Yuan/kilometre on the G2 Beijing-Shanghai expressway.

3) 2.5 Yuan/kilometre on the G4 Beijing-Hong Kong-Macao expressway.

4) 2 Yuan/kilometre on the G103 Beijing Tanggu line, S12 airport expressway.

Mode B2: the payment terminal obtains the payment amount corresponding to the vehicle identification information from a stored charging standard.

In the mode B2, the payment amounts corresponding to different types of vehicles on various roadways are recorded in the charging standard, and the type of the vehicle is determined according to the vehicle identification information. For example, the vehicle identification information is the information containing the vehicle type, where the vehicle type can be for example truck, car, bus or the like; or the vehicle identification information is the license plate number, where the corresponding type includes local license plate and nonlocal license plate.

Figure 2:
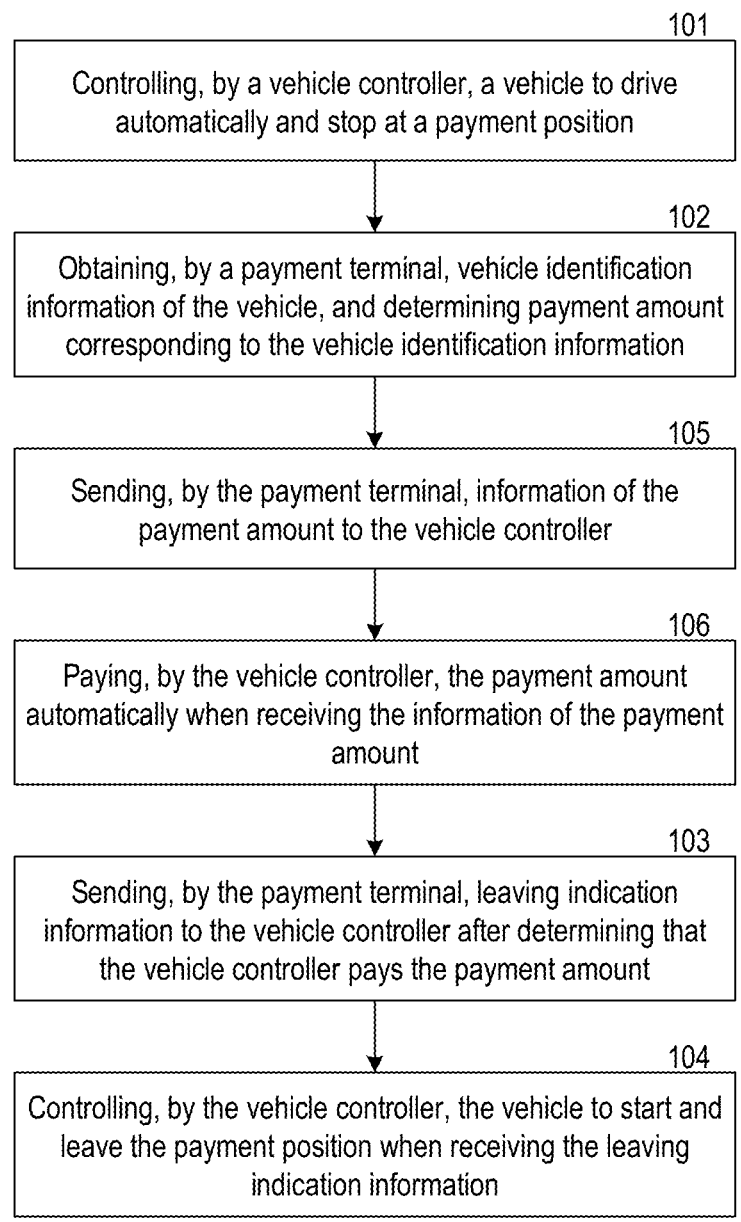
FIG. 2 is the second one of flow charts of a method of implementing vehicle automatic payment in an embodiment of the present application.

In an example, the payment terminal sends information of the determined payment amount to the vehicle controller, and the vehicle controller pays the corresponding payment amount actively. The method as shown in FIG. 1 further includes steps 105 and 106, as shown in FIG. 2:

Step 105: sending, by the payment terminal, information of the payment amount to the vehicle controller.

Step 106: paying, by the vehicle controller, the payment amount automatically when receiving the information of the payment amount.

At this point, in the above step 103, the payment terminal determines that the vehicle controller pays the payment amount, which includes: the payment terminal determines that the vehicle controller pays the payment amount when collecting the payment amount paid by the vehicle controller successfully.

In some embodiments, in the above step 106, the vehicle controller pays the payment amount automatically when collecting the payment amount, which can be implemented by but not limited to any of the following modes (modes C1 to C2):

Mode C1: the vehicle controller invokes a third-party payment software to pay the payment amount.

Mode C2: the vehicle controller controls an on-board camera to scan a two-dimensional code corresponding to the payment terminal, and invokes a third-party payment software to pay the payment amount.

In the mode C2, the two-dimensional code corresponding to the payment terminal is arranged at a position around the payment terminal.

In an example, the payment terminal in the embodiments of the present application directly records the payment amount in the bill of the payer in way of keeping accounts when determining the payment amount, the payment terminal sends the bill to the payer periodically (e.g., every month, every quarter, every half year or every year), and the payer pays the corresponding fees, where the payer can be the driver of the vehicle, the transport company to which the vehicle belongs, or the like.

In yet another example, the payment terminal can also prestore the association relationship of the vehicle identification information and the account of Electronic Toll Collection (ETC) system of each vehicle, and when a vehicle passes through the payment terminal, the payment terminal deducts the current payment amount from the account of ETC system corresponding to the vehicle identification information of this vehicle.

Figure 3:
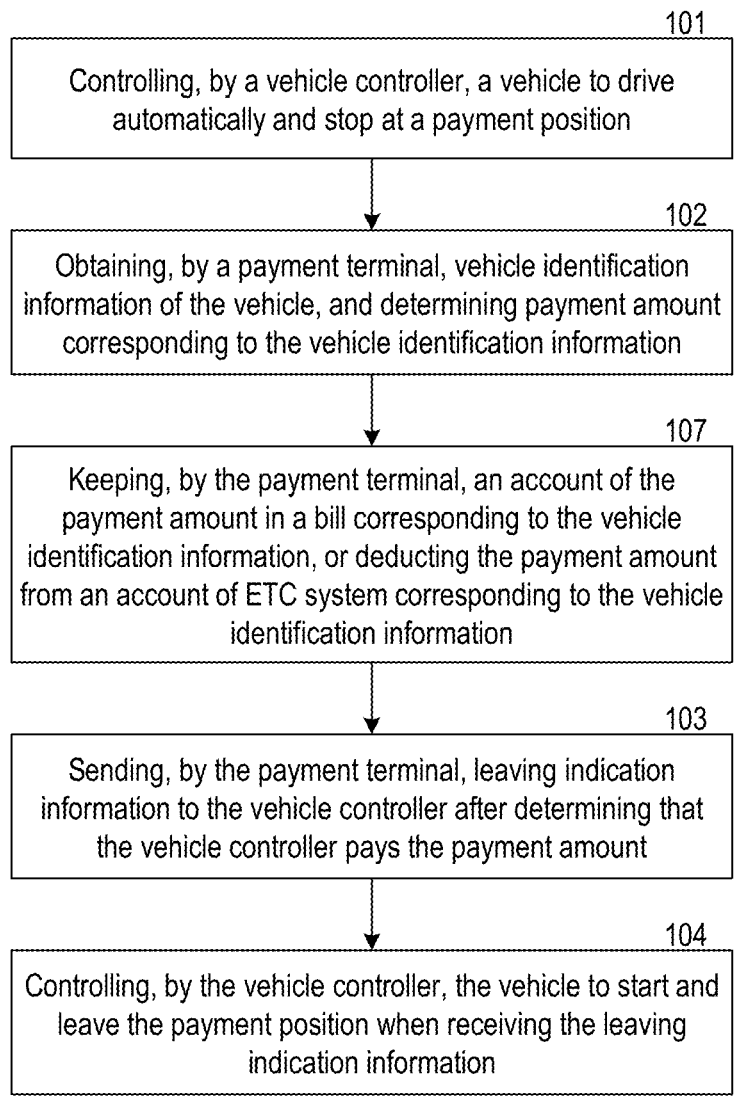
FIG. 3 is the third one of flow charts of a method of implementing vehicle automatic payment in an embodiment of the present application.

Based on the two ways described above, the above method flow as shown in FIG. 1 further includes the following step 107, as shown in FIG. 3:

Step 107: keeping, by the payment terminal, an account of the payment amount in a bill corresponding to the vehicle identification information, or deducting the payment amount from an account of ETC system corresponding to the vehicle identification information.

In the above step 103, the payment terminal determines that the vehicle controller pays the payment amount, which includes: the payment terminal determines that the vehicle controller pays the payment amount after keeping the account of the payment amount in the bill successfully or deducting the payment amount from the account of ETC system successfully.

Second Embodiment

Figure 4:
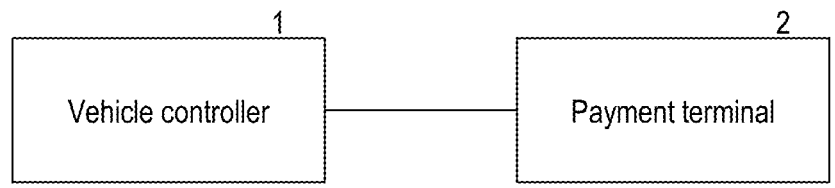
FIG. 4 is a structural schematic diagram of a system of implementing vehicle automatic payment in an embodiment of the present application.

Based upon the same concept as the method of implementing vehicle automatic payment provided by the first embodiment described above, the second embodiment of the invention provides a system of implementing vehicle automatic payment. The structure of the system is as shown in FIG. 4, which includes a vehicle controller 1 and a payment terminal 2, wherein:

the vehicle controller 1 is configured to control a vehicle to drive automatically and stop at a payment position, and control the vehicle to start and leave the payment position when receiving leaving indication information sent by the payment terminal 2;

the payment terminal 2 is configured to obtain vehicle identification information of the vehicle, determine payment amount corresponding to the vehicle identification information, and send the leaving indication information to the vehicle controller 1 after determining that the vehicle controller 1 pays the payment amount.

In some embodiments, the payment terminal 2 determines the payment amount corresponding to the vehicle identification information, which includes:

the payment terminal 2 obtains the weighing result and the driving mileage corresponding to the vehicle identification information, and calculates the payment amount according to the weighing result and the driving mileage;

or, the payment terminal 2 obtains the payment amount corresponding to the vehicle identification information from a stored charging standard.

In some embodiments, the payment terminal 2 is further configured to send information of the payment amount to the vehicle controller 1; and the vehicle controller 1 is further configured to pay the payment amount automatically when receiving the information of the payment amount.

In some embodiments, the payment terminal 2 is further configured to keep an account of the payment amount in a bill corresponding to the vehicle identification information, or deduct the payment amount from an account of ETC system corresponding to the vehicle identification information after calculating the payment amount.

In some embodiments, the payment terminal 2 obtains the vehicle identification information of the vehicle, which includes:

the payment terminal 2 controls a sensor to take an image of the vehicle, and performs image identification processing on the image to obtain the vehicle identification information of the vehicle; or, the payment terminal 2 controls the sensor to scan a two-dimensional code or bar code on the vehicle, to obtain the vehicle identification information of the vehicle.

Third Embodiment

Figure 5:
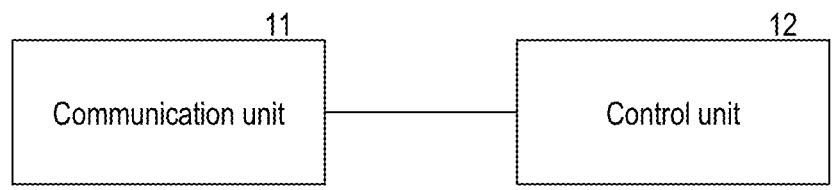
FIG. 5 is a structural schematic diagram of a vehicle controller in an embodiment of the present application.

The third embodiment of the present application provides a vehicle controller. The structure of the vehicle controller is as shown in FIG. 5, which includes:

a communication unit 11 configured to receive and send information; and a control unit 12 configured to control a vehicle to drive automatically and stop at a payment position, and control the vehicle to start and leave the payment position when receiving, through the communication unit 11, leaving indication information from a payment terminal.

In some embodiments, the control unit 12 is further configured to pay payment amount automatically when receiving, through the communication unit 11, the information of the payment amount.

In some embodiments, the control unit 12 pays the payment amount automatically, which includes:

the control unit 12 invokes a third-party payment software to pay the payment amount; or, the control unit 12 controls an on-board camera to scan a two-dimensional code corresponding to the payment terminal, and invokes a third-party payment software to pay the payment amount.

Fourth Embodiment

Figure 6:
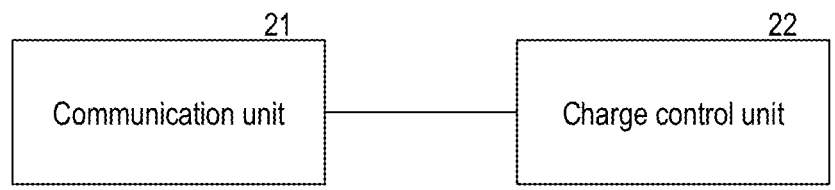
FIG. 6 is a structural schematic diagram of a payment terminal in an embodiment of the present application.

The fourth embodiment of the invention provides a payment terminal. The structure of the payment terminal is as shown in FIG. 6, which includes:

a communication unit 21 configured to receive and send information; and a charge control unit 22 configured to obtain vehicle identification information of a vehicle stopping at a payment position, determine payment amount corresponding to the vehicle identification information, and send leaving indication information to a vehicle controller of the vehicle after determining that the vehicle controller of the vehicle pays the payment amount.

In some embodiments, the charge control unit 22 determines the payment amount corresponding to the vehicle identification information, which includes:

the charge control unit 22 obtains the weighing result and the driving mileage corresponding to the vehicle identification information, and calculates the payment amount according to the weighing result and the driving mileage; or the charge control unit 22 obtains the payment amount corresponding to the vehicle identification information from a stored charging standard.

In some embodiments, the charge control unit 22 is further configured to send, through the communication unit 21, information of the payment amount to the vehicle controller; and the charge control unit 22 determines that the vehicle controller pays the payment amount, which includes: the charge control unit determines that the vehicle controller pays the payment amount when collecting, through the communication unit, the payment amount paid by the vehicle controller successfully.

In some embodiments, the charge control unit 22 is further configured to keep an account of the payment amount in a bill corresponding to the vehicle identification information, or deduct the payment amount from an account of ETC system corresponding to the vehicle identification information after determining the payment amount; and the charge control unit 22 determines that the vehicle controller pays the payment amount, which includes: the charge control unit 22 determines that the vehicle controller pays the payment amount after keeping the account of the payment amount in the bill successfully or deducting the payment amount from the account of ETC system successfully.

In some embodiments, the charge control unit 22 obtains the vehicle identification information of the vehicle, which includes:

the charge control unit 22 controls a sensor to take an image of the vehicle, and performs image identification processing on the image to obtain the vehicle identification information of the vehicle; or, the charge control unit 22 controls the sensor to scan a two-dimensional code or bar code on the vehicle, to obtain the vehicle identification information of the vehicle.

It should be understood by those skilled in the art that the embodiments of the present application can provide methods, systems and computer program products. Thus the present application can take the form of hardware embodiments alone, application software embodiments alone, or embodiments combining the application software and hardware aspects. Also the present application can take the form of computer program products implemented on one or more computer usable storage mediums (including but not limited to magnetic disk memories, CD-ROMs, optical memories and the like) containing computer usable program codes therein.

The present application is described by reference to the flow charts and/or the block diagrams of the methods, the devices (systems) and the computer program products according to the embodiments of the present application. It should be understood that each process and/or block in the flow charts and/or the block diagrams, and a combination of processes and/or blocks in the flow charts and/or the block diagrams can be implemented by the computer program instructions. These computer program instructions can be provided to a general-purpose computer, a dedicated computer, an embedded processor, or a processor of another programmable data processing device to produce a machine, so that an apparatus for implementing the functions specified in one or more processes of the flow charts and/or one or more blocks of the block diagrams is produced by the instructions executed by the computer or the processor of another programmable data processing device.

These computer program instructions can also be stored in a computer readable memory which is capable of guiding the computer or another programmable data processing device to operate in a particular way, so that the instructions stored in the computer readable memory produce a manufacture including the instruction apparatus which implements the functions specified in one or more processes of the flow charts and/or one or more blocks of the block diagrams.

These computer program instructions can also be loaded onto the computer or another programmable data processing device, so that a series of operation steps are performed on the computer or another programmable device to produce the computer-implemented processing. Thus the instructions executed on the computer or another programmable device provide steps for implementing the functions specified in one or more processes of the flow charts and/or one or more blocks of the block diagrams.

Although the preferred embodiments of the present application have been described, those skilled in the art can make additional alterations and modifications to these embodiments once they learn about the basic creative concepts. Thus the attached claims are intended to be interpreted to include the preferred embodiments as well as all the alterations and modifications falling within the scope of the present application.

Evidently those skilled in the art can make various modifications and variations to the present application without departing from the spirit and scope of the present application. Thus the present application is also intended to encompass these modifications and variations therein as long as these modifications and variations to the present application come into the scope of the claims of the present application and their equivalents.

What is claimed is:

1. A method of implementing vehicle automatic payment, comprising:

receiving, by a vehicle controller of a vehicle, information of a payment amount from a payment terminal arranged at a payment position, wherein the payment amount is corresponding to a vehicle identification information of the vehicle; and paying, by the vehicle controller, the payment amount automatically in response to receiving the information of the payment amount, wherein said paying comprises:

controlling, by the vehicle controller, an on-board camera to scan a two-dimensional code corresponding to the payment terminal in response to receiving the information of the payment amount; and invoking, by the vehicle controller, a third-party payment software to pay the payment amount in response to scanning the two-dimensional code.

2. The method of claim 1, further comprising controlling, by the vehicle controller of the vehicle, the vehicle to drive automatically and be stopped at the payment position.

3. The method of claim 1, further comprising controlling, by the vehicle controller of the vehicle, the vehicle to start moving in response to receiving, by the vehicle controller, a leaving indication information from the payment terminal so that the vehicle leaves the payment position.

4. The method of claim 1, further comprising providing, by the vehicle controller of the vehicle, the vehicle identification information of the vehicle to the payment terminal.

5. The method of claim 4, wherein the vehicle identification information of the vehicle comprises a license plate number.

6. The method of claim 4, wherein the vehicle identification information of the vehicle corresponds to a weight of the vehicle.

7. The method of claim 4, wherein the vehicle identification information of the vehicle corresponds to a driving mileage of the vehicle.

8. The method of claim 4, wherein the vehicle identification information of the vehicle corresponds to a type of the vehicle, wherein the type of the vehicle is one of: a truck, a car, or a bus.

9. The method of claim 1, wherein the payment amount is obtained using a charging standard.

10. A vehicle controller of a vehicle, comprising:
a communication unit configured to receive and send information; and
a control unit configured to:
receive, through the communication unit, information of a payment amount from a payment terminal arranged at a payment position, wherein the payment amount is corresponding to a vehicle identification information of the vehicle; and
pay the payment amount automatically in response to receiving the information of the payment amount, comprising:
controlling, by the control unit, an on-board camera to scan a two-dimensional code corresponding to the payment terminal in response to receiving the information of the payment amount; and
invoking, by the control unit, a third-party payment software to pay the payment amount in response to the two-dimensional code.

11. The vehicle controller according to claim 10, wherein the control unit is further configured to drive the vehicle automatically and stop the vehicle at the payment position.

12. The vehicle controller according to claim 10, wherein the control unit is further configured to control the vehicle to start moving in response to receiving, through the communication unit, leaving indication information from the payment terminal.

13. The vehicle controller according to claim 11, wherein the controller comprises one of: a digital signal processor (DSP) or a field-programmable gate array (FPGA).

14. The vehicle controller according to claim 10, wherein the controller is an Electronic Control Unit (ECU) of the vehicle.

15. The vehicle controller according to claim 10, wherein the communication unit is further configured to communicate with the payment terminal via Bluetooth.

16. The vehicle controller according to claim 10, wherein the communication unit is further configured to communicate with the payment terminal via a base station.

17. A non-transitory computer-readable storage medium comprising computer-executable instructions which, when executed by an on-board computer of a vehicle, cause the computer to:
receive information of a payment amount from a payment terminal arranged at a payment position, wherein the payment amount is corresponding to a vehicle identification information of the vehicle; and
pay the payment amount automatically in response to receiving the information of the payment amount, wherein said paying comprises:
controlling an on-board camera of the vehicle to scan a two-dimensional code corresponding to the payment terminal in response to receiving the information of the payment amount; and
invoking a third-party payment software to pay the payment amount in response to the two-dimensional code.

18. The non-transitory computer-readable storage medium according to claim 17, wherein the two-dimensional code corresponding to the payment terminal is arranged at a position around the payment terminal.

19. The non-transitory computer-readable storage medium according to claim 17, wherein the vehicle identification information is obtained by taking an image corresponding to the vehicle and identifying the image.

20. The non-transitory computer-readable storage medium according to claim 19, wherein the image comprises a two-dimensional code or a bar code containing the vehicle identification information, wherein the two-dimensional code or the bar code is displayed on the vehicle.

* * * * *